United States Patent [19]
Iizuka

[11] Patent Number: 5,830,105
[45] Date of Patent: Nov. 3, 1998

[54] AUXILIARY BRAKE APPARATUS

[75] Inventor: Naonori Iizuka, Fuji, Japan

[73] Assignee: Jatco Corporation, Japan

[21] Appl. No.: 730,043

[22] Filed: Oct. 11, 1996

[30] Foreign Application Priority Data

Oct. 11, 1995 [JP] Japan .................................. 7-289242

[51] Int. Cl.⁶ .............................................. B60K 41/26
[52] U.S. Cl. .......................................... 477/92; 192/216
[58] Field of Search ............................... 192/4 B; 477/92, 477/95; 123/323; 303/124; 701/70

[56] References Cited

U.S. PATENT DOCUMENTS

| | | | |
|---|---|---|---|
| 4,309,918 | 1/1982 | Miller et al. | 477/92 |
| 4,497,219 | 2/1985 | Elsner | 192/4 B X |
| 5,107,725 | 4/1992 | Takahashi | 477/95 |
| 5,282,399 | 2/1994 | Sano et al. | 477/92 |
| 5,351,795 | 10/1994 | Dadel et al. | 192/4 B X |
| 5,362,285 | 11/1994 | Sano et al. | 477/92 |

*Primary Examiner*—Rodney H. Bonck
*Attorney, Agent, or Firm*—Rossi & Associates

[57] ABSTRACT

An auxiliary brake apparatus is provided that includes an exhaust brake system for restricting a channel area of an exhaust passage so as to increase a resistance to rotary motion of an engine, and a retarder disposed between an automatic transmission and vehicle wheels, for generating a braking force that resists an engine brake torque transmitted to the automatic transmission. The auxiliary brake apparatus further includes a required braking force determining device for determining a braking force applied to a vehicle body during down-shifting, depending upon a vehicle speed and a type of shifting, before the automatic transmission is shifted down while the exhaust brake system is actuated, and a retarder braking force control device for causing the retarder to generate a braking force during the down-shifting so that an engagement load applied to an engaging element of the automatic transmission becomes not greater than a predetermined level when the exhaust brake system and the retarder generate the braking force determined by the required braking force determining device.

2 Claims, 5 Drawing Sheets

AUXILIARY BRAKE APPARATUS

BACKGROUND OF THE INVENTION

1. Field of the Invention

The present invention relates to an auxiliary brake apparatus having an exhaust brake system and a retarder that are actuated at the same time to reduce a speed of a vehicle body.

2. Description of the Prior Art

A service brake system installed on an automobile is adapted to frictionally restrict rotation of vehicle wheels with a pressure that varies with an amount by which a brake pedal is depressed. When an amount of depression of an accelerator pedal is reduced, on the other hand, an engine brake is applied utilizing compressive resistance of an engine, so as to offset drive force transmitted from vehicle wheels to the engine.

An automobile equipped with a turbo charger using an exhaust turbine, a truck having a large gross vehicle weight including an on-board load, or a large bus that often runs on a superhighway, for example, is equipped with an exhaust brake system or a retarder as an auxiliary brake system, since these kinds of vehicles tend to suffer from an insufficient effect of the engine brake and excessive wear of the service brake system.

The auxiliary brake system is normally controlled by a control device using a microcomputer or the like, to semi-automatically operate under a condition where the engine brake is to be applied, so as to supplement the effect of the engine brake and lower the frequency of use of the service brake system.

The retarder, a device adapted to apply a load to a rotating drive-force transmitting system of an automobile so as to take the energy, is used in practical applications in the form of an eddy-current type that uses a permanent magnet or an electromagnet to generate electromagnetic braking force, or a fluid type that generates braking force by changing the flow resistance of an oil circulated by an oil pump.

The exhaust brake system consists principally of a valve body provided in an exhaust passage of the engine, and a drive mechanism for the valve body. The channel area or cross sectional area of the exhaust passage is reduced or restricted by the valve body so as to provide large resistance to the rotary motion of the engine, thereby to enhance the engine brake effect.

Japanese Patent Application laid-open No. 2-258462 discloses an exhaust brake system wherein the opening of the valve body is controlled to an intermediate value so that the level of the braking force can be continuously changed. The ordinary exhaust brake system, however, does not control the braking force as subtly as in the above system, but is only placed in one of its actuated and non-actuated (ON/OFF) positions.

Japanese Patent Application laid-open No. 4-193656 shows an example in which both of the exhaust brake system and the retarder installed on the vehicle operate in association with to each other.

In this example, if a driver releases the accelerator pedal, the exhaust brake system and retarder are concurrently actuated so as to apply relatively large braking force to the vehicle body. It is also possible to actuate only one of the exhaust brake system and retarder, through a switch provided at a driver's seat.

If the exhaust brake system is actuated to increase the resistance to the rotary motion of the engine, a relatively large engine brake torque is applied from the vehicle wheels to the engine through the automatic transmission, as compared with the case where the exhaust brake is not applied, resulting in a large load on engaging elements in the automatic transmission. If the transmission is shifted down while the vehicle is decelerated with the exhaust brake system actuated, in particular, the transmitted torque is increased and shift shocks occur upon a change of the gear ratio of the transmission during the shifting operation, resulting in a further increased load on the engaging elements. The engaging element that is frictionally engaged to transmit the large torque during the shifting operation, in particular, suffers from increased wear of engaged faces thereof, and the service life of such an engaging element is thus shortened.

In view of the above situation, Japanese Patent Application laid-open Nos. 62-61842 and 1-206141 discloses a technique for avoiding an increase in the engagement load applied to the engaging elements of the automatic transmission upon down-shifting during application of the exhaust brake. To this end, the oil pressure supplied to the relevant engaging element is controlled to a higher level while the exhaust brake system is actuated, than a level applied while the exhaust brake system is not actuated, so as to increase a permissible engagement load of the engaging element.

If the oil pressure level is increased as described above, however, increased loads are also applied to a snap ring for restricting a clutch plate in the axial direction, and a case and other components, as well as hydraulic cylinder and piston rod for driving the engaging element. This eventually requires provision of reinforced structures and/or replacement of components in various portions of the automatic transmission.

Since the resistance to the rotary motion of the engine that is being subjected to the engine brake is varied depending upon the displacement of the engine, weight of the vehicle body, braking capability of the exhaust brake system and so on, the same type of automatic transmission cannot be used for different vehicle types and driving environments, thus missing the interchangeability of the automatic transmission. If the same type of automatic transmission is used in common for a wide range of vehicle types, on the other hand, a heavy, large-sized automatic transmission will be undesirably installed on an automobile having a low-horse-power engine and an exhaust brake system capable of producing low braking force.

If the level of the oil pressure is restricted to increase the permissible engagement load of the engaging element, the range of adjustment of the oil pressure level is narrowed or reduced when the pressure level is to be adjusted so as to reduce shift shocks and control the shifting time. Thus, the oil pressure level cannot be sufficiently controlled, and shift shocks are thus increased.

SUMMARY OF THE INVENTION

It is therefore an object of the present invention to provide an auxiliary brake apparatus that eliminates a need to increase the level of the oil pressure supplied to engaging elements of an automatic transmission, thus permitting the same type of automatic transmission to be used with various types of engine and exhaust brake system, without requiring provision of reinforced structures or replacement of components within the automatic transmission.

The above object may be accomplished according to the principle of the present invention, which provides an auxiliary brake apparatus comprising: an exhaust brake system for restricting a channel area of an exhaust passage so as to increase a resistance to rotary motion of an engine; a retarder disposed between an automatic transmission and vehicle wheels, for regenerating a braking force that resists an engine brake torque transmitted to the automatic transmission; required braking force determining means for determining a braking force applied to a vehicle body during down-shifting, depending upon a vehicle speed and a type of shifting, before the automatic transmission is shifted down while the exhaust brake system is actuated; and retarder braking force control means for causing the retarder to generate a braking force during the down-shifting so that an engagement load applied to an engaging element of the automatic transmission becomes not greater than a predetermined level when the exhaust brake system and the retarder generate the braking force determined by the required braking force determining means.

In the auxiliary brake apparatus constructed as described above, the retarder prevents the automatic transmission from receiving a part of the engine brake torque transmitted from vehicle wheels to the engine. Namely, the torque of the braking force generated by the retarder puts a limit to the engine brake torque that occurs when the resistance to rotation of the engine due to operation of the exhaust brake system resists the inertia of the vehicle body, thereby to control the engagement load applied to the engaging element upon shifting of the transmission to be not greater than the predetermined level.

The operating conditions of the retarder are calculated prior to the shift-down operation that takes place while the exhaust brake system is actuated, so that the retarder produces an amount of the braking force that corresponds to an amount by which the engagement load of the engagement element exceeds the predetermined level, so as to set a limit to the engine brake torque transmitted through the automatic transmission. For example, the retarder is controlled to produce the braking force obtained by subtracting the braking force corresponding to the permissible engagement load of the engaging element, from the braking force determined based on the type of shifting and vehicle speed.

Since it is generally known to dispose the retarder downstream of the automatic transmission, the retarder as disclosed in Japanese Patent application laid-open No. 4-193656, which is disposed between the engine and the automatic transmission, may be moved to the downstream side of the automatic transmission. In this case, the engine brake torque transmitted through the automatic transmission is reduced by an amount equivalent to the braking torque of the retarder. It is also possible to implement special control upon down-shifting while the exhaust brake system is actuated, so that the retarder produces larger braking force during such down-shifting, than in a normal situation, as disclosed in Japanese Patent Application laid-open Nos. 52-61842 and 1-206141.

In the above-described techniques, however, the engine brake torque transmitted through the automatic transmission cannot be limited, for lack of an arrangement for determining the braking force generated by the retarder If the engine brake torque increases due to changes in the displacement of displacement of the engine, weight of the vehicle body, braking capability of the exhaust brake system, and other factors, therefore, the engagement load of the engaging element may be excessively increased to be larger than the predetermined level.

In the auxiliary brake apparatus as described above, an oil pressure applied to the engaging element during the down-shifting may be controlled to a level that is applied when the engine is in a coasting condition where a throttle opening is held at a minimum level, and the predetermined level of the engagement load may be determined so as to correspond to the level of the oil pressure applied in the coasting condition.

In the above arrangement, the oil pressure level is not increased during the down-shifting so as to temporarily increase the permissible engagement load of the engaging element. Thus, an excessive engine brake torque that exceeds the permissible engagement load corresponding to the oil pressure level in the coasting condition is cancelled by the braking force generated by the retarder, and thus not received by the automatic transmission.

BRIEF DESCRIPTION OF THE DRAWINGS

The invention will be described in greater detail with reference to a certain preferred embodiment thereof and the accompanying drawings, wherein.

DETAILED DESCRIPTION OF THE PREFERRED EMBODIMENT

Figure 1:
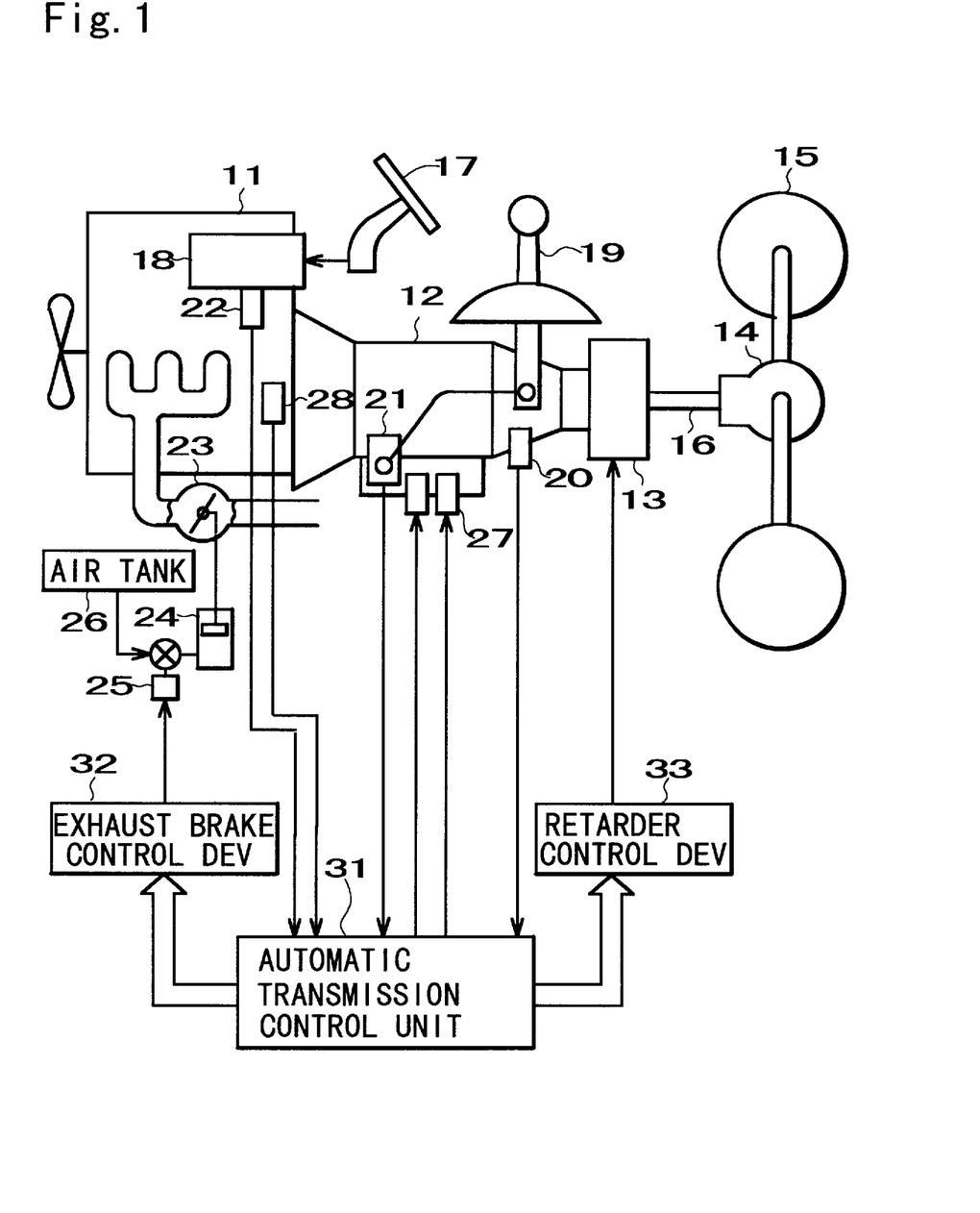
FIG. 1 is an explanatory view of the construction of an auxiliary brake apparatus as one embodiment of the present invention.
Figure 2:
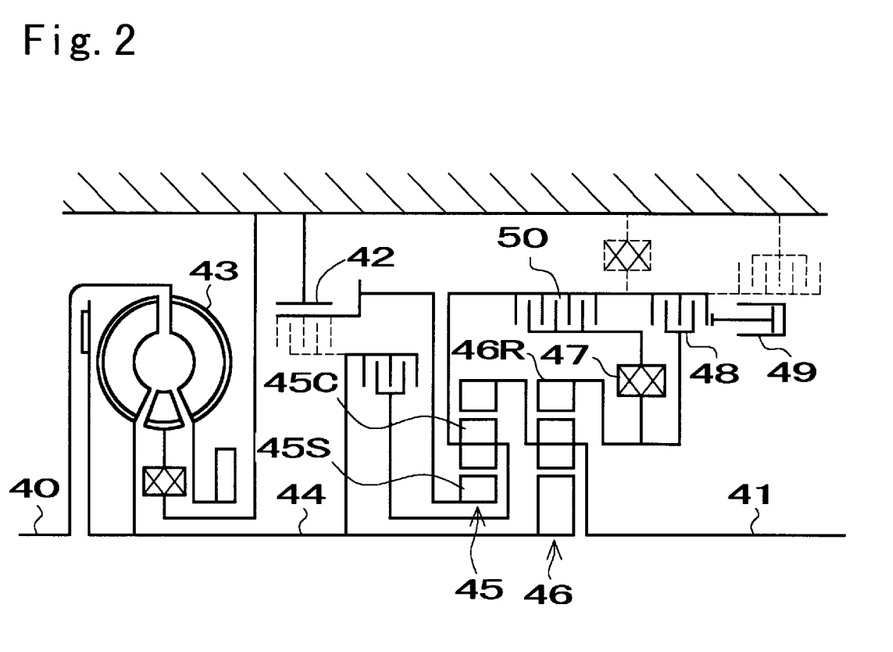
FIG. 2 is an explanatory view of an internal mechanism of an automatic transmission.
Figure 3:
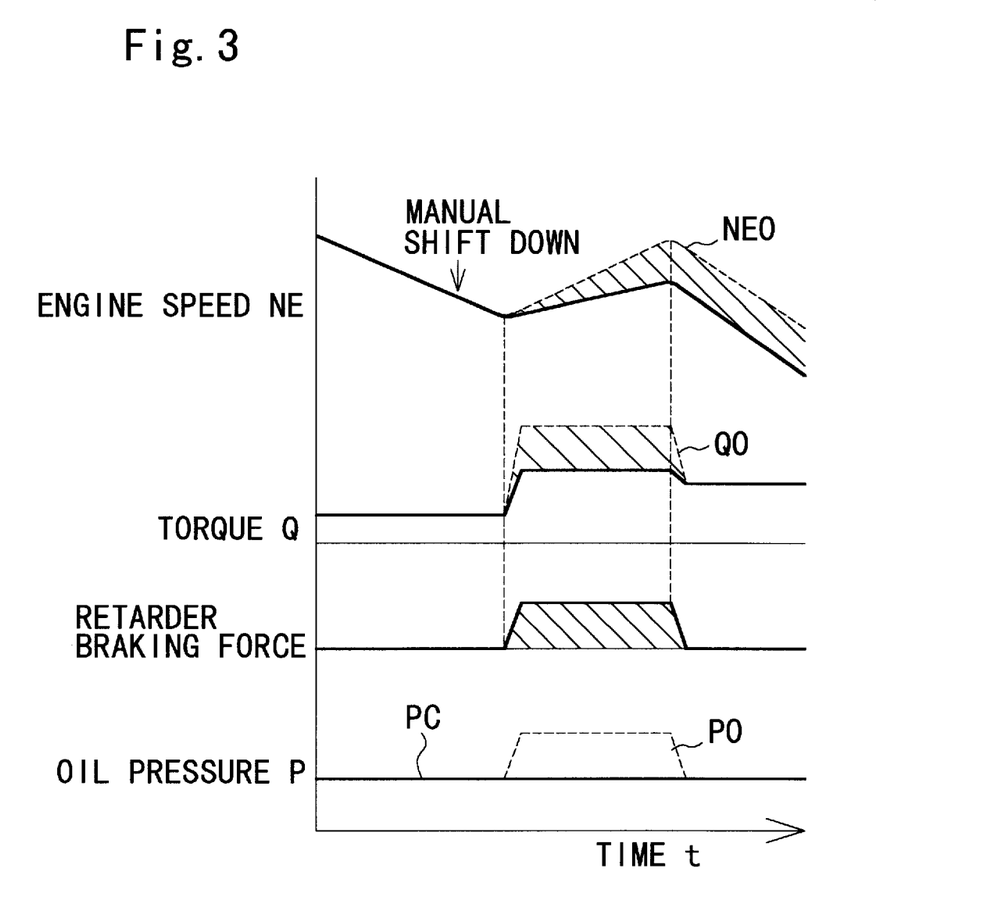
FIG. 3 is a time chart used for controlling a retarder.
Figure 4:
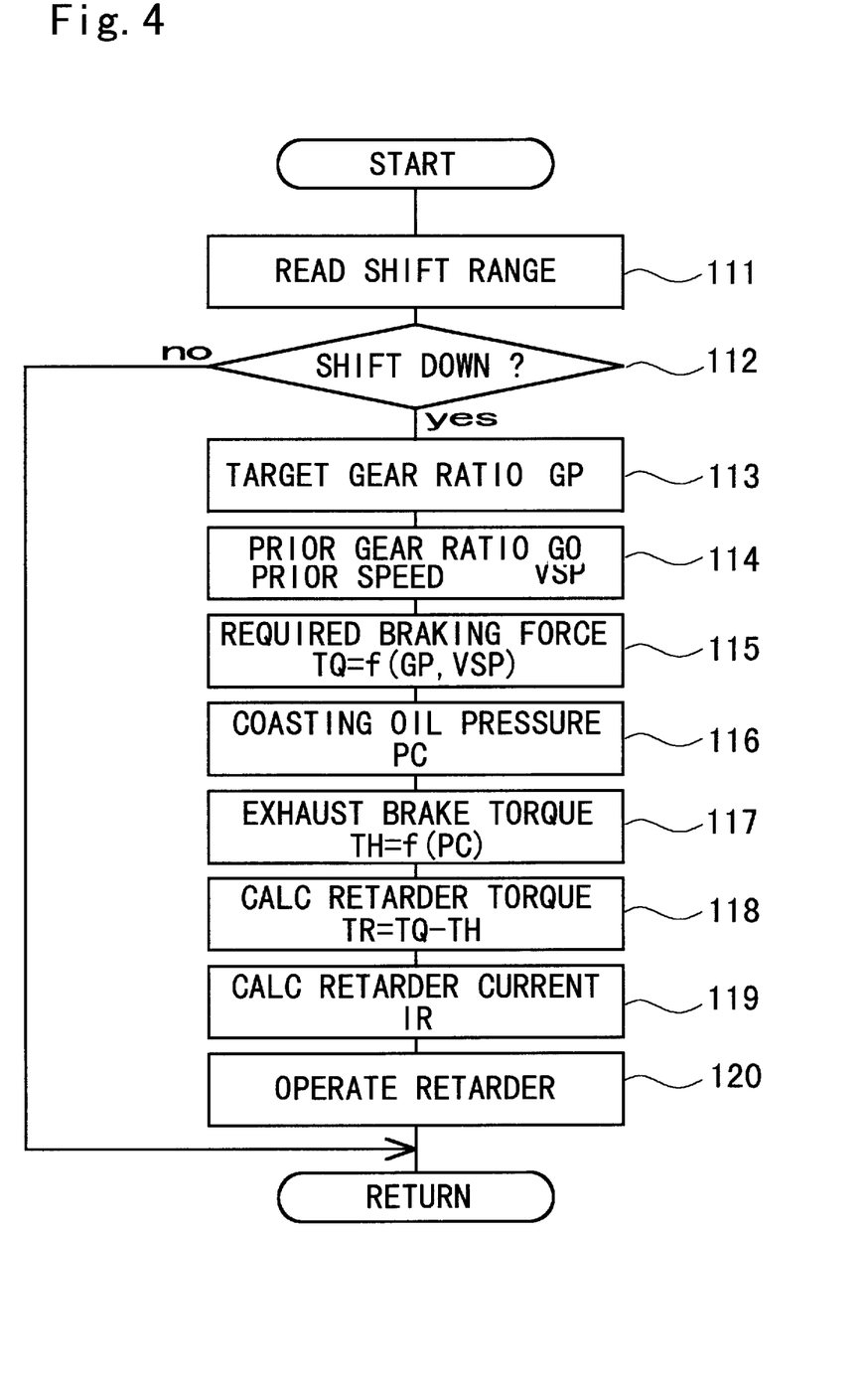
FIG. 4 is a flow chart showing control of the retarder.
Figure 5:
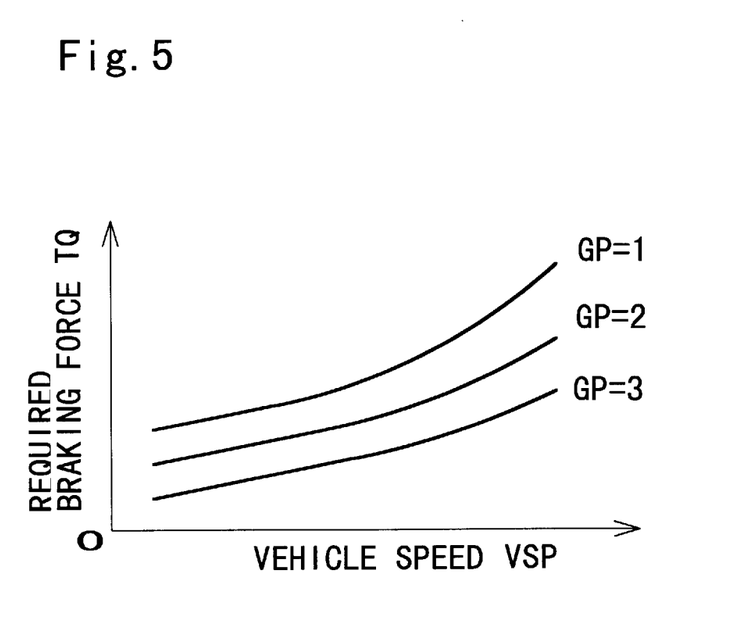
FIG. 5 is a graph showing the relationship between the required braking force and the vehicle speed.

Referring to FIG. 1 through FIG. 5, there will be described auxiliary brake control according to one embodiment of the present invention. FIG. 1 is an explanatory view of the construction of an auxiliary brake apparatus, and FIG. 2 is an explanatory view of an internal mechanism of an automatic transmission. FIG. 3 is a time chart used for controlling a retarder, and FIG. 4 is a flow chart showing control of the retarder, while FIG. 5 is a graph showing the relationship between the required braking force and the vehicle speed.

As shown in FIG. 1 showing a power transmitting system, the rotating speed of an output shaft of an engine 11 is changed by an automatic transmission 12, and the power of the engine 11 is then transmitted to rear wheels 15, through a propeller shaft 16 and a differential mechanism 14, so as to drive the wheels 15. This power transmitting system further includes an exhaust brake system 23 and an eddy-current type retarder 13 as the auxiliary brake apparatus.

The eddy-current type retarder 13 is disposed downstream of the automatic transmission 12, and applies braking force that corresponds to a level of current supplied from a retarder control device 33, to an output shaft of the automatic transmission 12. The engine brake torque is applied from the rear wheels 15 to the automatic transmission 12, through the differential mechanism 14 and the propeller shaft 16. Where the braking force is generated by the retarder 13, the automatic transmission 12 receives a torque obtained by subtracting the braking torque of the retarder 13 from the engine brake torque.

An exhaust brake 23 disposed in an exhaust pipe of the engine 11 is driven by an air cylinder 24, such that an exhaust pressure of the engine 11 is increased by reducing a cross sectional area or channel area of the exhaust pipe so as to restrict exhaust gases emitted by the engine 11 and thus increase the resistance to rotary motion of the engine 11. The engine brake torque received by the engine 11 through the automatic transmission 12 is offset by a load that is the sum of the innate resistance to the rotary motion of the engine 11 and the resistance to the engine rotary motion due to the exhaust brake system 23. In other words, the torque equivalent to the resistance to the rotary motion of the engine 11, which includes the effect of the exhaust brake, is transmitted through the automatic transmission 12 placed in a suitable gear ratio, so as to form the engine brake torque on the side of the rear wheels 15.

The exhaust brake system 23 operates when an exhaust brake control device 32 turns on an electromagnetic valve 25, and compressed air is supplied from an air tank 26 to the air cylinder 24 through the electromagnetic valve 25, so as to rotate a valve body and restrict the channel area of the exhaust pipe. The exhaust brake is released when the exhaust brake control device 32 turns off the electromagnetic valve 25, and the compressed air in the air cylinder 24 is discharged so as to place the valve body in a position to open the exhaust pipe.

The output of the engine 11 varies with a throttle opening TVO of a throttle valve 18 that corresponds to a degree by which an accelerator pedal 17 is depressed by a driver. A throttle sensor 22 disposed adjacent the throttle valve 18 generates an analog voltage signal representing the throttle opening TVO.

A vehicle speed sensor 20 disposed in the automatic transmission 12 generates a voltage signal whose frequency varies with the vehicle speed. An engine speed sensor 28 generates a voltage signal whose frequency varies with a rotating speed of the output shaft of the engine 11.

An inhibiter switch 21 generates a code signal corresponding to a shift mode that is established with a select lever 19 operated by the driver. The shift mode is selected from seven ranges, i.e., OD (overdrive) range selected upon running of the vehicle on a superhighway or the like, D (drive) range selected upon normal running, 2nd-speed and 1st-speed ranges selected when engine brake or rapid acceleration are needed, N (neutral) range, P (parking) range, and R (reverse) range selected upon reverse running.

With the OD range selected, the automatic transmission 12 is placed in one of 1st-speed gear position to 4th-speed (overdrive) gear position (change gear ratio being less than 1). With the D range selected, the transmission 12 is placed in one of 1st-speed gear position to 3rd (direct-drive) gear position (change gear ratio being equal to 1).

An automatic transmission control unit 31 computes the throttle opening TVO based on the output signal of the throttle sensor 22, computes the vehicle speed VSP based on the output signal of the vehicle sensor 28, and computes the engine speed NE based on the output signal of the engine speed sensor 28. The control unit 31 also determines points of time when the shifting operation of the automatic transmission 12 is initiated and terminated, based on momentary changes in the engine speed NE.

The automatic transmission control unit 31 selects shifting conditions by identifying the shift mode established through the inhibited switch 21, and determines the shifting time by collating the current throttle opening TVO and vehicle speed VSP with the selected shifting conditions. With the shifting time thus determined, the control unit 31 operates the electromagnetic valve 27 of the automatic transmission 12 so as to establish an appropriate gear position of the automatic transmission 12.

The exhaust brake control device 32 and retarder control device 33 receive various momentary information through the automatic transmission control unit 31. The information includes the throttle opening TVO, vehicle speed VSP, engine speed NE, and an output state with respect to the automatic transmission 12.

When an exhaust brake switch (not shown) provided in a vehicle compartment is placed in its ON state, and the throttle opening TVO goes down below a threshold value set for an engine idle condition with the accelerator pedal 17 released by the driver, the exhaust brake control device 32 operates the exhaust brake system 23 to apply a large decelerating force to the vehicle body to reduce the vehicle speed.

When a shift-down operation is carried out while the exhaust brake is being applied, the retarder control device 33 causes the retarder 13 to apply braking force during the shift-down operation, to inhibit an excessive engine brake torque from being applied to the automatic transmission 12. Namely, the automatic transmission 12 receives a torque obtained by subtracting the braking torque of the retarder 13 from the engine brake torque transmitted from the vehicle wheels 15 as the vehicle speed is reduced.

Where an overdrive cancel operation is effected in which the OD range is shifted down to the D range, or a manual shift-down operation is effected in which the OD or D range is shifted down to the 2nd- or 1st-speed range, the level of the braking force generated by the retarder 13 during the down-shifting is determined prior to the shift-down operation.

Initially, the required braking force TQ is calculated based on the change gear ratio GP to be achieved after the shifting and the vehicle speed SP detected before the shifting. The required braking force TQ is determined as shown in FIG. 5 based on the engine brake torque that increases with changes in the gear ratio GP upon down-shifting while the exhaust brake 23 is operated and the retarder 13 is not operated.

Subsequently, the retarder torque TR is calculated by subtracting the exhaust brake torque TH corresponding to a permissible engagement load of an engaging element from the required braking force TQ, and operating conditions of the retarder 13 that correspond to the retarder torque TR are determined. The retarder 13 is operated under these operating conditions, from the time (received from the automatic transmission control unit 31) when the shifting operation is initiated until the time (received from the control unit 31) when the shifting operation is terminated.

As shown in FIG. 2, the rotary motion of the output shaft 40 of the engine 11 is transmitted to a turbine shaft 44 through a torque converter 43, and then to the output shaft 41 of the transmission 12 after the rotating speed of the output shaft 40 is changed by planetary gear devices 45, 46.

When the transmission 12 is shifted down from the 3rd-speed to 2nd-speed gear position by manually operating the select lever 19 to the 2nd-speed range, a clutch 48 is engaged by a hydraulic cylinder 49 after a clutch 51 is released. With the clutch 48 engaged, a ring gear 46R of the planetary gear device 46 and a pinion carrier 45C of the planetary gear device 45 are adapted to transmit the torque in opposite directions. As a result, the engine brake received by the output shaft 41 is transmitted to the turbine shaft 44, through the planetary gear device 45 in which a sun gear 45S is locked by a brake 42.

Upon engagement of the clutch 48, a large load that exceeds the permissible engagement load is applied to the clutch 48, possibly causing an excessive slip between engaged faces. In a conventional automatic transmission, therefore, the oil pressure PC supplied to the hydraulic cylinder 49 is increased to the oil pressure P0, as indicated by a broken line in FIG. 3. Further, in view of the heat generated by friction that increases as the clutch 48 is slowly engaged, the engagement of the clutch 48 must be rapidly completed in the conventional transmission so as to avoid the heat.

In the present embodiment, on the other hand, the engine torque received by the automatic transmission 12 is limited by the braking force of the retarder 13 as described above. With any combination of the type of shifting and the vehicle speed VSP, therefore, the automatic transmission 12 does not receive an excessive engine brake torque that exceeds the range of the permissible engagement load of the clutch 48 at the hydraulic pressure PC. The oil pressure PC is a level of the oil pressure that is applied in an engine coasting condition where the driver releases the accelerator pedal 17.

Referring to FIG. 3, there will be described an example of control of the retarder 13 after the manual shift-down operation.

While the automatic transmission 12 is being placed in the 3rd-speed gear position with the D-range selected, and the vehicle is being decelerated with the accelerator pedal 17 released by the driver, suppose that the driver wishes to further decelerate the vehicle and manually operates the select lever 19 to the 2nd-speed range in a timing as indicated by an arrow in FIG. 3. In this case, the automatic transmission control unit 31 immediately switches the electromagnetic valve 27 of the automatic transmission 12 in response to the manual shift-down operation, to carry out the down-shifting from the 3rd-speed to 2nd-speed gear position.

The engine 11 that actuates the exhaust brake system 23 is caused to lower the engine speed NE in accordance with the throttle opening TVO during the shift-down operation. Nevertheless, a change in the gear ratio GP during the shifting of the automatic transmission 12 overcomes the resistance to the rotary motion of the engine 11, thereby forcing the engine speed NE to be increased. With the engine speed NE thus increased, the engine brake torque is temporarily increased, and the vehicle body is greatly decelerated during the shifting operation.

The retarder control device 33 keeps generating the braking force W from the beginning to the end of the shifting operation that are detected based on changes in the engine speed NE. The torque Q transmitted by the automatic transmission 12 is reduced as compared with the torque QO (as indicated by a broken line) transmitted when the retarder 13 is not operated, thereby to reduce a load applied to the clutch 48.

The braking force of the retarder 13 sets a limit to the engine brake torque transmitted to the engine 11 through the automatic transmission 12, while assuring a total effect of an engine brake applied to the vehicle body. When the exhaust brake system 23 is operated and the retarder 13 is not operated, on the other hand, the engine speed NE is increased up to the broken line NE0 in FIG. 3, and a large engine brake torque that corresponds to an increase amount of the engine speed NE passes through the automatic transmission 12. Accordingly, the retarder 13 bears the engine brake torque that corresponds to a hatched portion below the broken line NE0.

Consequently, the clutch 48 is free from excessive slips and heat even without temporarily increasing the oil pressure PC supplied to the hydraulic cylinder 49 to the oil pressure P0 indicated by the broken line in FIG. 3, while assuring a great engine brake effect.

Referring to a flow chart of FIG. 4, there will be described a control routine according to which the retarder 13 is controlled by the retarder control device 33.

In step 111, the shift range established by the select lever 19 is read. Step 112 is then executed to determine whether the shift range has been changed or not, and whether the change, if any, is caused by the overdrive cancel operation, or manual shift-down operation in which the select lever 19 is operated to the 1st-speed range or 2nd-speed range. If an affirmative decision is obtained in step 112, operating conditions of the retarder 13 are determined in steps 113–119, and the retarder 13 is actuated in step 120. If a negative decision is obtained in step 112, the control flow skips these steps 113–120.

In step 113, the gear position of the transmission 12 to be established after the shift-down operation is determined referring to the shift range read in step 111, and the target gear ratio GP of the determined gear position is obtained.

In step 114, the gear position before the shift-down operation is judged, and the gear ratio GO of this gear position is obtained. Thus, a change in the gear ratio before and after the shifting is obtained and the type of shifting is specified. Further, the vehicle speed VSP before the shift-down operation is retrieved from the automatic transmission control unit 31.

In step 115, the required braking force TQ is calculated based on the vehicle speed VSP and the target gear ratio GP, referring to the graph of FIG. 5. The required braking force TQ corresponds to a level of the braking force that does not make the driver feel awkward upon down-shifting while the exhaust brake 23 is operated, for example. The required braking force TQ of FIG. 5 is determined based on actually measured values related to degrees of increases in the braking force when the shifting occurs due to the manual shift-down operation or overdrive cancel operation, with respect to various vehicle speeds VSP.

In step 116, the oil pressure PC that appears upon coasting is read from the automatic transmission control unit 31. The coast oil pressure PC is set by the automatic transmission 12 to correspond to the coasting condition of the vehicle where the accelerator pedal 17 is released.

In step 117, the exhaust brake torque TH is calculated. The exhaust brake torque TH is the maximum permissible level of engine brake torque that can be received by the automatic transmission 12. This torque TH is calculated according to the following equation, using the friction coefficient $\mu$, effective diameter D, pressure-receiving area A and number of sheets n of the clutch 48, and the coast oil pressure PC:

$$TH=f(PC)=n\times\mu\times D\times PC\times A.$$

In step 118, the retarder torque TR is calculated based on the required braking force TQ and the exhaust brake torque TH, according to the following equation:

$$TR=TQ-TH.$$

In step 119, the retarder supply current IR corresponding to the retarder torque TR is calculated. In step 120, the retarder supply current IR is supplied to the retarder 13 for a period of time from the beginning to the end of the shifting that are read from the automatic transmission control unit 31.

According to the auxiliary brake control of the present embodiment, the resistance to the rotary motion of the engine 11 while it is coasting is increased by actuating the exhaust brake system 23, so that a large engine brake torque is applied to the rear wheels 15 to sufficiently effectively decelerate the vehicle body. Upon down-shifting from the 3rd-speed to 2nd-speed gear position, the retarder 13 bears a part of the engine brake torque so as to reduce the load on the clutch 48 that is engaged with friction within the automatic transmission 12, while assuring a sufficiently large engine brake torque. This eliminates possibilities that an excessively large engine brake torque induces slips of the clutch 48 and accelerates wear of engaged faces of the clutch 48, and that excessive heat is generated to deteriorate the oil used in the transmission 12.

Further, there is no need to control the automatic transmission 12 to temporarily increase the level of the oil pressure supplied to the hydraulic cylinder 49, resulting in simplified hydraulic control of the automatic transmission 12 during its shifting operation. The hydraulic control of the transmission 12 is also effected in a wide adjustable range that is selected so as to effectively reduce shift shocks.

Since the engine brake torque received by the automatic transmission 12 is limited by the braking force of the retarder 13, an excessively estimated engine brake torque need not be considered in designing components of the transmission 12. Namely, requirements for high strength or durability are reduced with respect to engaged faces of clutches, driving piston, snap rings, case and others, and the automatic transmission 12 as a whole can be designed with increased freedom, making it easy to reduce the size and weight of the transmission 12.

In the present embodiment, there is no need for the automatic transmission 12 to be prepared for a particular situation that the transmission 12 is shifted down while the exhaust brake is applied. Namely, the same type of automatic transmission 12 can be used as it is for various types of engine, without replacing components or requiring reinforced structures depending upon the displacement of the engine, weight of the vehicle body, braking capability of the exhaust brake system, and so on. There is also no need to provide an exclusive cooling mechanism to remove the heat of the clutch 48 that is generated with an increase of the engagement load.

While the present embodiment uses the exhaust brake control device 32 and retarder control device 33 that are independent of the automatic transmission control unit 31, an auxiliary brake control device that performs the functions of the exhaust brake control device 32 and retarder control device 33 may be provided, or the automatic transmission control unit 31 may perform the functions of the exhaust brake control device 32 and retarder control device 33.

Further, the operated amount of the exhaust brake system 23 may be adjusted in a plurality of steps as disclosed in Japanese Patent Application laid-open No. 2-258462, so as to reduce the operated amount of the exhaust brake system 23 while the braking force is generated by the retarder 13. In this case, the resistance to the rotary motion of the engine 11 due to the effect of the exhaust brake 23 is lowered with a result of a further reduced load on the clutch 48.

Moreover, the balance between the effect of the exhaust brake 23 and the braking force of the retarder 13 may be varied while so as to maintain the engagement load of the clutch 48 at a constant level, while assuring a sufficiently high engine brake effect to the vehicle body due to the effect of the exhaust brake and the braking force of the retarder 13. For example, the output shaft of the automatic transmission 12 is provided with a torque sensor, and the braking force of the retarder 13 is increased or reduced in appropriate timing so that the torque measured during application of the engine brake is kept at a predetermined level.

The retarder 13 may also produce the braking force before and after the shift-down operation as well as during the down-shifting, such that the braking force of the retarder 13 is increased only during the down-shifting.

No matter what control is performed, the braking force generated by the retarder during the down-shifting is determined prior to the shift-down operation, so that the braking force of the retarder sets a limit to the engine brake torque transmitted to the engine through the automatic transmission. The braking force of the retarder is controlled to a level that does not cause the load applied to the engaging element during the shifting to be equal to or larger than a predetermined level.

In the flow chart of FIG. 4, steps 113–115 correspond to the required braking force determining means of the present invention, and steps 116–120 correspond to the retarder braking force control means of the invention.

In the auxiliary brake apparatus constructed as described above, when the automatic transmission is shifted down while the exhaust brake system is actuated, the retarder operates to set a limit to the engine brake torque received by the automatic transmission, so as not to apply an excessive load that is larger than a permissible engagement load, to the engaging element that is involved in the shift-down operation. Thus, the engaging element is free from excessive slips or heat, and can be used for an entire period of its service life.

Since the load applied to the engaging element does not exceed its permissible engagement load even with changes in the displacement of the engine, weight of the vehicle body, braking capability of the exhaust brake system, vehicle speed and the type of shifting, the same type of automatic transmission may be used in common for a wide range of vehicle types, without replacing components of the transmission or providing a reinforced structure within the transmission in an attempt to deal with a particular situation that the transmission is shifted down while the exhaust brake is applied.

Further, the auxiliary brake apparatus of the present embodiment does not increase the oil pressure applied to the engaging element upon down-shifting with the exhaust brake system actuated, thus eliminating a need to replace a snap ring adapted to position the engaging element or a hydraulic piston for driving the engaging element, so as to deal with the increase of the oil pressure.

What is claimed is:

1. An auxiliary brake apparatus comprising:
   an exhaust brake system for restricting a channel area of an exhaust passage so as to increase a resistance to rotary motion of an engine;
   a retarder disposed between an automatic transmission and vehicle wheels, for generating a braking force that resists an engine brake torque transmitted to the automatic transmission;
   required braking force determining means for determining a braking force applied to a vehicle body during down-shifting, depending upon a vehicle speed and a type of shifting, before the automatic transmission is shifted down while said exhaust brake system is actuated; and
   retarder braking force control means for causing said retarder to generate a braking force during the down-shifting so that an engagement load applied to an engaging element of said automatic transmission becomes not greater than a predetermined level when said exhaust brake system and said retarder generate the braking force determined by said required braking force determining means.

2. An auxiliary brake apparatus according to claim 1, wherein an oil pressure applied to said engagement element during the down-shifting is controlled to a level that is applied when the engine is in a coasting condition where a throttle opening is kept at a minimum level, and wherein said predetermined level of said engagement load is determined so as to correspond to said level of the oil pressure applied in the coasting condition.

* * * * *